(12) United States Patent
Laroia et al.

(10) Patent No.: US 6,580,761 B2
(45) Date of Patent: Jun. 17, 2003

(54) CODING TECHNIQUE IN DISCRETE MULTI-TONE (DMT) BASED COMMUNICATIONS SYSTEMS

(76) Inventors: Rajiv Laroia, 104 S. Longfellow Dr., Princeton Junction, NJ (US) 08550; Jin-Der Wang, 9 Buckingham Dr., Ocean, NJ (US) 07712

(*) Notice: Subject to any disclaimer, the term of this patent is extended or adjusted under 35 U.S.C. 154(b) by 50 days.

(21) Appl. No.: 09/843,502

(22) Filed: Apr. 26, 2001

(65) Prior Publication Data

US 2001/0036233 A1 Nov. 1, 2001

Related U.S. Application Data

(62) Division of application No. 09/100,615, filed on Jun. 16, 1998.

(51) Int. Cl.$^7$ .................................................. H04K 1/10
(52) U.S. Cl. .................................... 375/260; 375/240
(58) Field of Search .......................... 375/260, 265, 375/295, 340, 316, 222, 240, 259; 370/319, 203, 206, 281, 337, 347, 344, 478, 480, 485

(56) References Cited

U.S. PATENT DOCUMENTS

| | | | | |
|---|---|---|---|---|
| 5,479,447 A | * | 12/1995 | Chow et al. | 370/468 |
| 5,673,290 A | * | 9/1997 | Cioffi | 370/210 |
| 6,128,349 A | * | 10/2000 | Chow | 370/464 |
| 6,370,153 B1 | * | 4/2002 | Eng | 370/438 |
| 6,373,859 B1 | * | 4/2002 | Jedwab et al. | 370/479 |

* cited by examiner

Primary Examiner—Jean Corrielus
Assistant Examiner—Emmanuel Bayard (57) ABSTRACT

In an Asymmetric Digital Subscriber Loop (ADSL) Discrete Multi-Tone (DMT) system, ADSL DMT equipment includes an encoder that operates on a DMT input signal representing $f$ symbols/sec. to generate, for transmission, a DMT output signal representing $Nf$ symbols/sec., where $N>1$, and where each symbol from the DMT input signal is generated in a redundant form in the DMT output signal. In one example of a redundant form, each symbol from the DMT input signal is repeated in N consecutive symbol intervals in the DMT output signal. In another example of a redundant form, every N DMT input symbol values are transmitted in 2N consecutive symbol intervals in the DMT output signal. These 2N consecutive symbols in the DMT output signal include 1) N symbols whose values equal the respective N DMT input symbol values and 2) N symbols whose values are a function of the respective N DMT input symbol values.

17 Claims, 10 Drawing Sheets

CE GATE DETECTOR FOR
EXTRACTING A DMT SYMBOL

FIG. 17 ously. In addition, the high-speed of these ADSL
CODING TECHNIQUE IN DISCRETE MULTI-TONE (DMT) BASED COMMUNICATIONS SYSTEMS This application is a divisional of the co-pending commonly assigned U.S. patent application Ser. No. 09/100,615 filed Jun. 16, 1998.

FIELD OF THE INVENTION

This invention relates generally to communications and, more particularly, to high-speed data communications systems.

BACKGROUND OF THE INVENTION

Plain Old Telephone Service (POTS) is typically deployed to individual subscribers over a twisted pair of wire. Today, in addition to voice services, more and more subscribers want high-speed data access to, e.g., the Internet, over this twisted pair. One technology that increases the transmission capacity over a twisted pair is Asymmetric Digital Subscriber Loop (ADSL). One version of ADSL increases the bandwidth of the twisted pair up to 1.1 Mhz (megahertz), which provides transmission capabilities up to 9 Mbps (millions of bits per second).

ADSL allocates different amounts of bandwidth between upstream communications and downstream communications (hence the term "asymmetric"), with upstream communications having less bandwidth than downstream communications. In this context, there are different strategies for specific bandwidth allocation and different modulation methods available. For example, in the upstream direction, i.e., from a subscriber's consumer premises equipment (CPE) to a central office (CO) (or local exchange carrier (LEC)) the upstream channel may have an allocated bandwidth from 25 Khz (kilohertz) to 138 Khz; while in the downstream direction, i.e., from the CO to the CPE, the downstream channel may have an allocated bandwidth from 138 Khz to 1.1 Mhz. (The POTS voice channel (0 to 4 Khz) is unaffected by ADSL). In this example, the upstream channel and downstream channel are disjoint and also adjacent. However, ADSL systems can be constructed where the upstream channel partially overlaps with the downstream channel. While this provides more bandwidth for the downstream signal, this also requires the use of echo cancellation techniques. Turning to modulation methods, carrierless amplitude phase (CAP) modulation or Discrete Multi-Tone (DMT) modulation can be used. (DMT is a form of orthogonal frequency division multiplexing (OFDM).)

One standard for ADSL transmission is ANSI T1.413. This standard specifies the use of DMT modulation, which utilizes multiple carriers (also sometimes referred to as subcarriers) for conveying information. In DMT modulation, the allocated frequency range is divided into K carrier channels, K>1, each carrier channel separated by approximately 4 Khz. In such an approach, a DMT-based ADSL system transmits what is referred to as "multi-tone symbols" or "DMT symbols."

Unfortunately, a DMT-based ADSL system is particularly susceptible to impulse noise (which, in the frequency domain goes across all frequencies). As a result, impulse noise hits can cause unrecoverable errors in a DMT-based ADSL system. In addition, the high-speed of these ADSL systems presents challenges in terms of providing equipment designs that not only provide protection against impulse noise but are also comparably lower in cost, i.e., have less processor complexity.

SUMMARY OF THE INVENTION

We have realized a method and apparatus for providing a coding technique in multi-carrier communications systems that not only provides additional protection against the above-mentioned impulse noise but also has comparably low cost, i.e., is less complex. In particular, and in accordance with the principles of the invention, a multi-carrier transmission signal is formed where each symbol value is transmitted in a redundant form over a plurality of consecutive symbol intervals. As a result, this symbol redundancy provides protection against impulse noise without requiring additional processor complexity.

In an embodiment of the invention, within a transmitter portion of ADSL DMT equipment an encoder operates on a DMT input signal representing $f$ symbols/sec. to generate, for transmission, a DMT output signal representing $Nf$ symbols/sec., where N>1. In this example, the redundant form is illustrated by repeating each input symbol value in N consecutive symbol intervals in the DMT output signal.

In another embodiment of the invention a different type of redundant form is illustrated. Again, within a transmitter portion of ADSL DMT equipment an encoder operates on a DMT input signal representing $f$ symbols/sec. to generate, for transmission, a DMT output signal representing $Nf$ symbols/sec., where N>1. In this example, every N DMT input symbol values are transmitted in 2N consecutive symbol intervals in the DMT output signal. These 2N consecutive symbol intervals in the DMT output signal include 1) N symbols whose values equal the respective N DMT input symbol values and 2) N symbols whose values are a function of the respective N DMT input symbol values.

DETAILED DESCRIPTION

Figure 1:
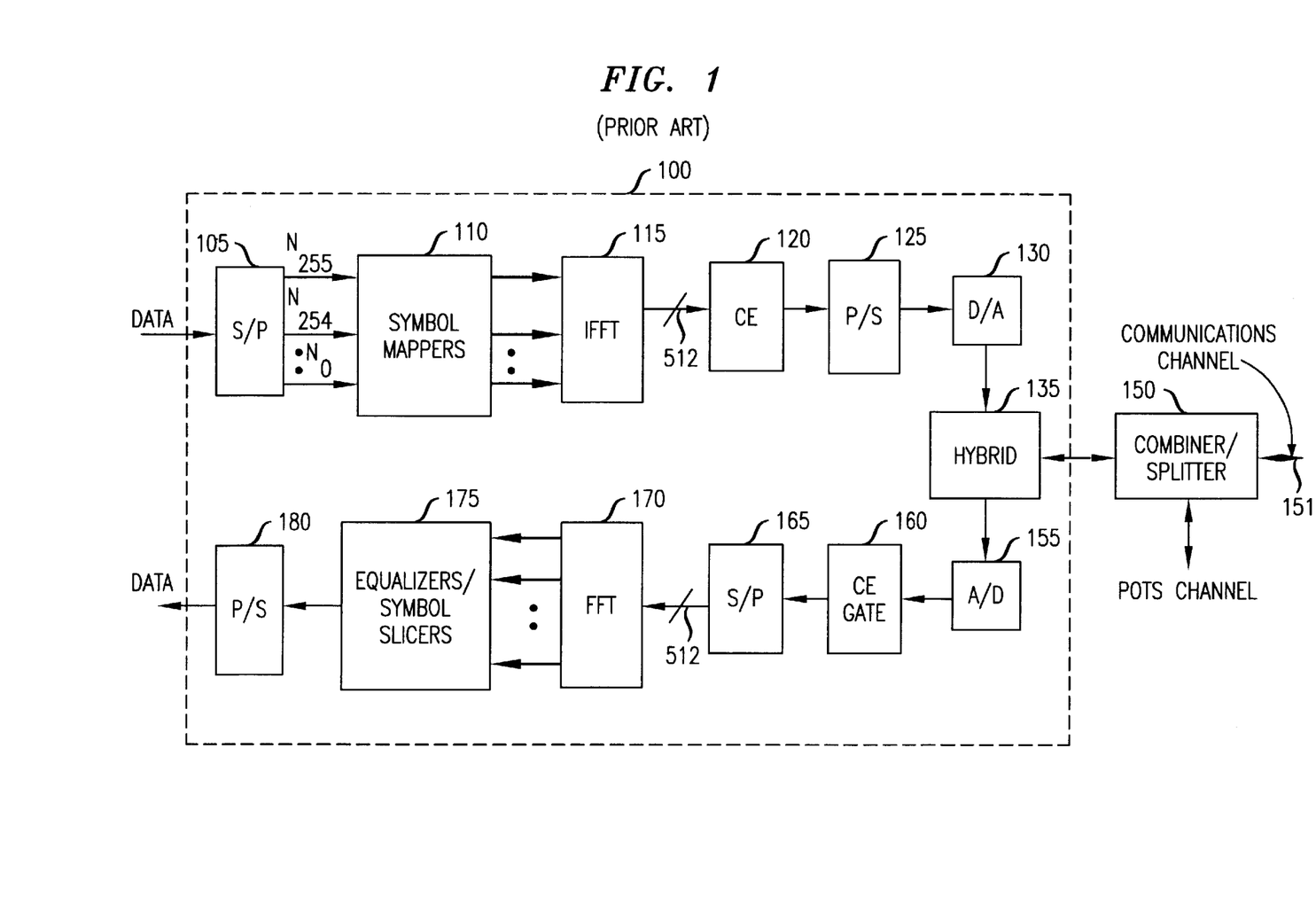
FIG. 1 illustrates prior art ADSL communications equipment.
Figure 2:
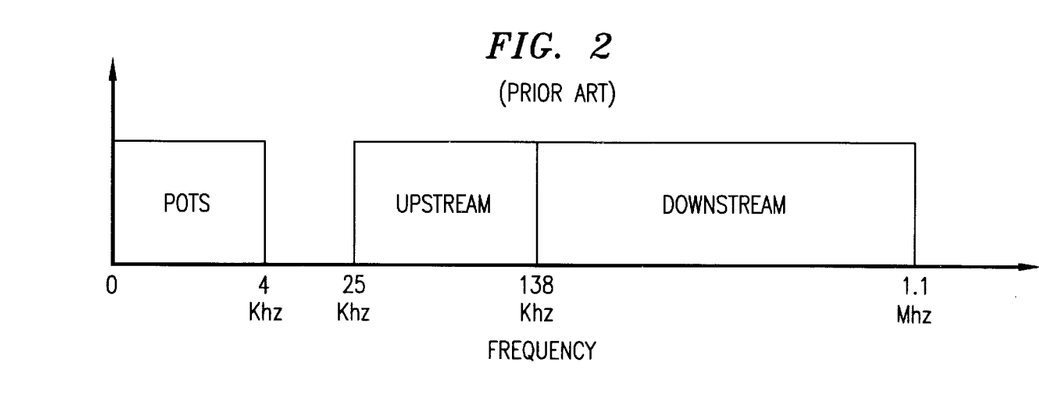
FIG. 2 shows an illustrative ADSL bandwidth allocation.

Before describing the inventive concept, prior art ADSL communications equipment 100, shown in FIG. 1, is described in order to provide some background information. The elements shown in FIG. 1 are well-known and will not be described in detail. For the purposes of description, it is assumed that ADSL equipment 100 is located at the CO. The corresponding ADSL equipment located at the subscriber's premise, i.e., the far-end ADSL equipment, or CPE, is similar and will not be described herein. It is assumed that ADSL equipment 100 conforms to ANSI T1.413. Also, it is assumed the ADSL system represented by FIG. 1 allocates bandwidth as shown in FIG. 2. The POTS channel is in the 0 to 4 Khz range, the upstream channel, i.e., from the CPE to the CO, is in the 25 Khz to 138 Khz; while the downstream channel, from the CO to the CPE, is in the 138 Khz to 1.1 Mhz range. As such, the upstream channel and downstream channel are disjoint and also adjacent.

Returning to FIG. 1, the transmitter portion of ADSL equipment 100 comprises serial-to-parallel converter (S/P) 105, symbol mappers 110, inverse fast Fourier transform element (IFFT) 115, cyclic extender (CE) 120, parallel-to-serial converter (P/S) 125, digital-to-analog converter (D/A) 130, and hybrid 135. A data signal is applied to S/P 105, which converts the data signal from serial to parallel form and provides 256 signals $n_0$ through $n_{255}$. Signal $n_0$ through $n_{255}$ are applied to symbol mappers 110. The latter comprises 256 symbol mappers, one for each of the parallel output signals of S/P 105. (As described further below, the number of bits encoded by each symbol mapper, and hence the number of bits S/P 125 provides in each $n_1$ is determined as a result of a spectral response determined during a training phase.) The resulting 256 output symbol streams from symbol mappers 110 are complex valued and are applied to IFFT 115, which modulates the various different carriers with the output symbol stream to provide 512 output signals. (IFFT 115 takes the complex conjugate (not shown) of the 256 output symbol streams to provide 512 real signals.) The 512 output signals from IFFT 115 are applied to CE 120, which performs cyclic extension (described below) and provides extended symbols in parallel form.

Figure 3:
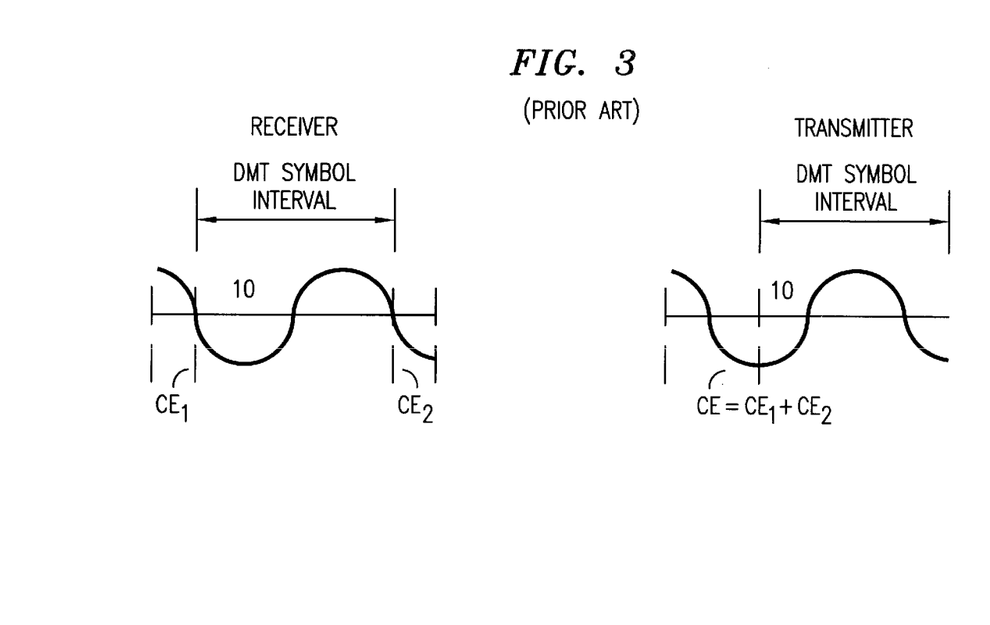
FIG. 3 conceptually illustrates cyclic extension as used in ADSL DMT transmission to compensate for ISI.

One problem in an ADSL DMT-based system is that there may be intersymbol interference (ISI), i.e., adjacent DMT symbols interfering with each other. To reduce the effect of ISI, the concept of "cyclic extension" is used. In cyclic extension, a DMT symbol is partially, and cyclically, extended in both directions. A conceptual illustration is shown in FIG. 3 for a single carrier at a receiver. The DMT symbol is represented by, e.g., the phase of carrier 10. Cyclic extension occurs before and after the DMT symbol. Essentially, carrier 10 is allowed to extend in both directions as represented by cyclic extension 1 ($CE_1$) and cyclic extension 2 ($CE_2$), which may or may not be equal to each other. $CE_1$ and $CE_2$ are a form of overhead in DMT transmission and are also known in the art as the prefix and the postfix, respectively. It should be noted that in practice an ADSL DMT transmitter simply adds a single cyclic extension, CE, to the DMT symbol, as shown in FIG. 3; while the receiver adjusts the sampling process such that, two apparent cyclic extensions, a $CE_1$ and $CE_2$ result, where $CE=CE_1$ and $CE_2$. As used herein, the term extended DMT symbol includes the DMT symbol plus at least one cyclic extension. The value of CE is adjusted as a function of the span of an estimated channel impulse response (described below).

These extended symbols are then applied to P/S 125 to provide a serial output signal, the DMT symbol plus cyclic extender, that is converted from digital to analog by A/D 130. The latter provides a downstream ADSL signal representing a sequence of extended DMT symbols, to hybrid 135, which couples this downstream ADSL signal to combiner/splitter 150, which adds in the POTS channel. The output signal from combiner/splitter 150 comprises the POTS channel in the 0 to 4 Khz range and the downstream signal in the 138 Khz to 1.1 Mhz range and is applied to the communications channel, represented by twisted pair 151.

The receiver portion of ADSL equipment 100 comprises hybrid 135, analog-to-digital converter (A/D) 155, CE gate 160, S/P 165, fast Fourier transform element 170, equalizer/symbol slicer 175, and P/S 180. Combiner/splitter 150 splits out the POTS channel from the signal present on twisted pair 151 and provides the remaining upstream ADSL signal (in the 138 Khz to 1.1 Mhz range) to hybrid 135. The latter couples the upstream ADSL signal to A/D 155, which converts the signal from analog to digital for application to CE gate 160. CE gate 160 extracts DMT symbols from each received extended DMT symbol, as known in the art. (It should be noted that the function of CE gate 160 could alternatively be performed after S/P 165.)

Figure 4:
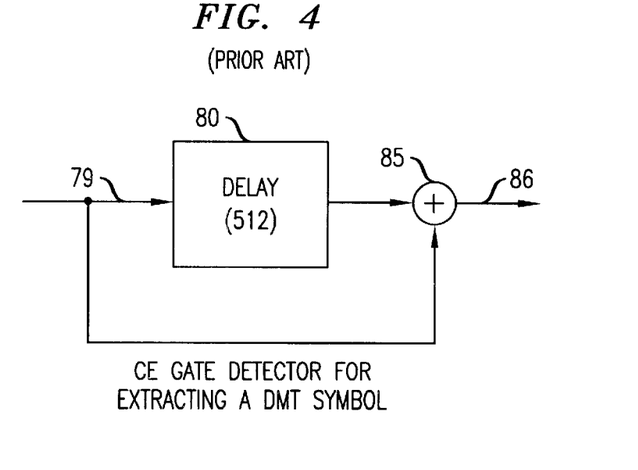
FIG. 4 shows an illustrative CE gate detector element of CE gate 160 of FIG. 1.

One function of CE gate 150 is to determine when to begin the extraction process. An illustrative structure for use within CE gate 150 is shown in FIG. 4. A signal 79, representing extended DMT symbols, is applied to delay element 80 and combiner 85. Delay element 80 in combination with combiner 85 allows comparison of a current sample with the value of the sample that occurred 512 points earlier. Combiner 85 provides a signal indicative of when in the extended DMT symbol the extraction process can being, i.e., what possible 512 samples represent the DMT symbol.

Returning to FIG. 1, the output signal from CE gate 160 is applied to S/P 165, which provides 512 output signals to FFT 170 which recovers the symbols from each of the carriers. Equalizers/symbol slicers 175 represents a plurality of equalizer and symbol slicer structures, one for each carrier for recovering the data signal in parallel form. The output signals of equalizers/symbol slicers 175 are applied to P/S 180 for converting the data signal back into serial form.

Figure 5:
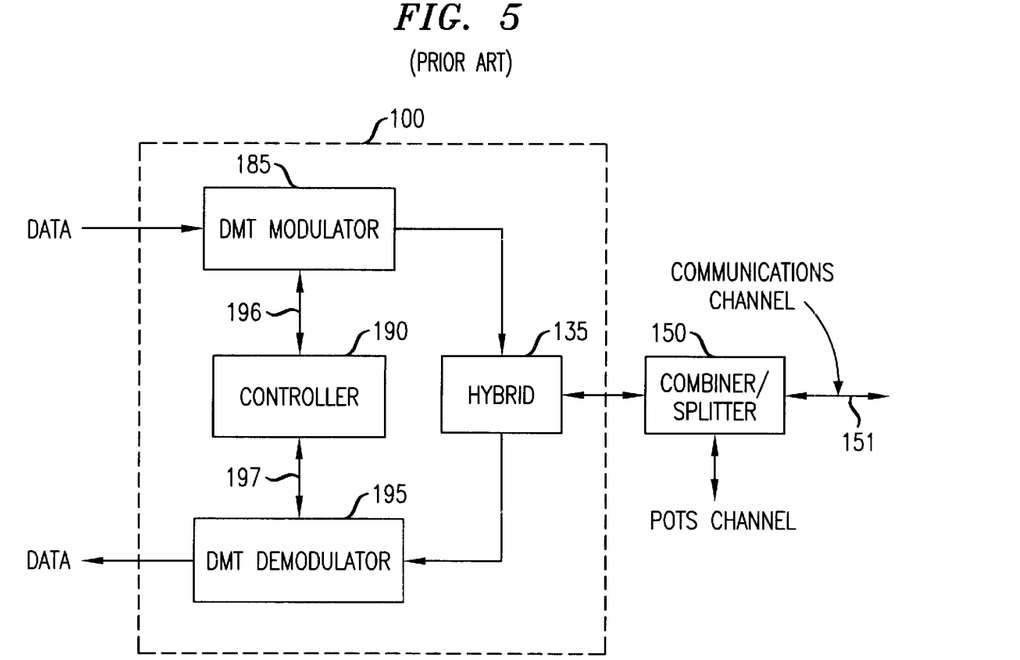
FIG. 5 illustrates another representation of prior art ADSL communications equipment.

An alternative representation of prior art ADSL equipment is shown in FIG. 5. It should be noted that like numbers in different figures are similar elements. ADSL equipment 100 is shown in FIG. 5 as comprising DMT modulator 185, DMT demodulator 195, hybrid 135, and controller 190. DMT modulator 185 operates as described above with respect to transmission of an ADSL signal and includes the above-mentioned components of FIG. 1 such as S/P 105, etc. Similarly, DMT demodulator 195 operates as described above with respect to reception of an ADSL signal and includes the above-mentioned components of FIG. 1 such as A/D 155, etc.

Also shown in FIG. 5 is controller 190, which is illustratively a stored-program controller and associated memory as known in the art. Controller 190 controls and receives information from DMT modulator 185 and DMT demodulator 195, via signaling 196 and 197, respectively. Generally speaking, an ADSL communications session comprises a training phase and a communications phase. During training, ADSL equipment 100 exchanges signaling with the far-end ADSL equipment (not shown). Controller 190 uses this signaling to establish the above-mentioned spectral response of communications channel 151 (as does a similar controller in the far-end ADSL equipment). The spectral response is affected by such items as cross-talk, physical loop length of the twisted pair of communications channel 151, etc. To determine the spectral response of the twisted pair, controller 190 generally performs the following steps. First, DMT modulator 185 transmits a wide band test signal to the far-end ADSL equipment. Upon receipt, the far-end ADSL equipment evaluates the received signal to determine the spectral response of the twisted pair. Once the spectral response is determined, the far-end ADSL equipment generates a bit loading table and sends the bit loading table to ADSL equipment 100. The bit loading table includes, for each carrier, a number of bits that each carrier can support. The bit loading table is used by controller 190 to select various operating parameters such as symbol mappings at each carrier. (Although each carrier can support up to M bits of information, the actual amount of bits a carrier supports varies due to the spectral response of the twisted pair at the different carrier frequencies. For example, one carrier may be able to accommodate 12 bits while another may be only able to accommodate 2 bits.) Once the training phase is complete, transmission can begin, i.e., the ADSL communications session enters the communications phase.

As noted earlier, a multi-carrier signal is more susceptible to impulse noise. In addition, the processing complexity of multi-carrier equipment increases with symbol rate because of the additional multi-carrier signal processing (e.g., IFFT in the transmitter portion and FFT in the receiver portion). However, we have realized a method and apparatus for providing a coding technique in multi-carrier communications systems that not only provides additional protection against the above-mentioned impulse noise but also has comparably low cost, i.e., is less complex. In particular, and in accordance with the principles of the invention, a multi-carrier transmission signal is formed where each symbol value is transmitted in a redundant form over a plurality of consecutive symbol intervals. As a result, this symbol redundancy provides protection against impulse noise without requiring additional processor complexity.

The inventive concept is applicable to all forms of multi-carrier transmission. One form of ADSL transmission is known as ADSL "Lite." In ADSL Lite, the transmission rate is around 1 Mbps (millions of bits per second) versus ADSL "Heavy" in which the transmission rate is around 6 Mbps. For ADSL Lite only a subset of carriers, or tones, are used, e.g., ½. However, and as described further below, one can use the entire available set of carriers and repeat the same DMT symbol and still maintain the same effective data rate.

It should be noted that the inventive concept transmits symbols in a "redundant form." As described further below, this redundant form can be achieved in any number of ways. As such, the inventive concept is not restricted to the redundant forms described herein. In addition, the inventive concept transmits redundant forms of "symbols." For the purposes of this description the terms extended DMT symbol and DMT symbol are interchangeable. Whether the extended DMT symbol is provided in a redundant form or the DMT symbol is provided in redundant form is a mere choice of hardware implementation—the inventive concept still applies.

Figure 6:
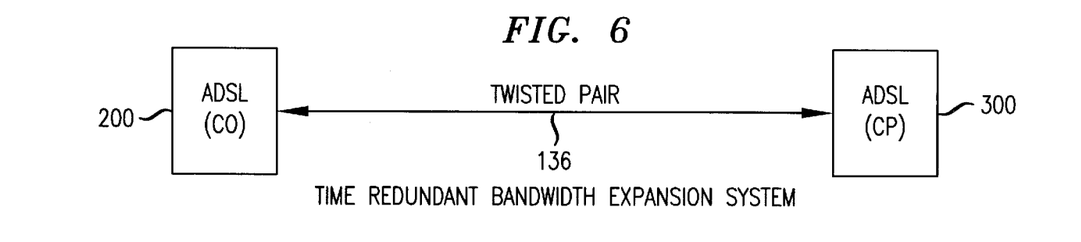
FIG. 6 shows an ADSL communications system in accordance with the principles of the invention.
Figure 7:
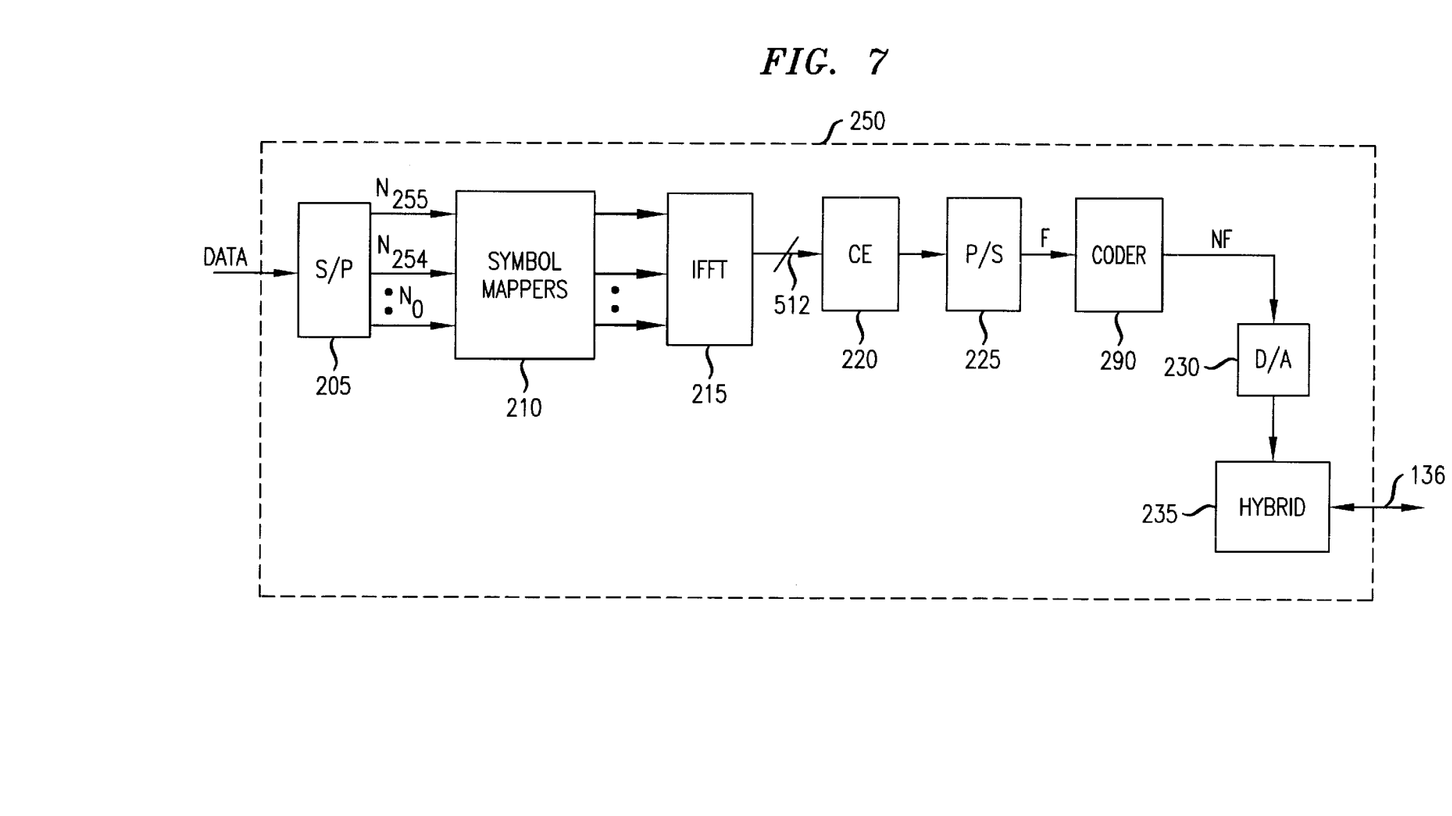
FIG. 7 shows a portion of a transmitter in accordance with the principles of the invention.
Figure 8:
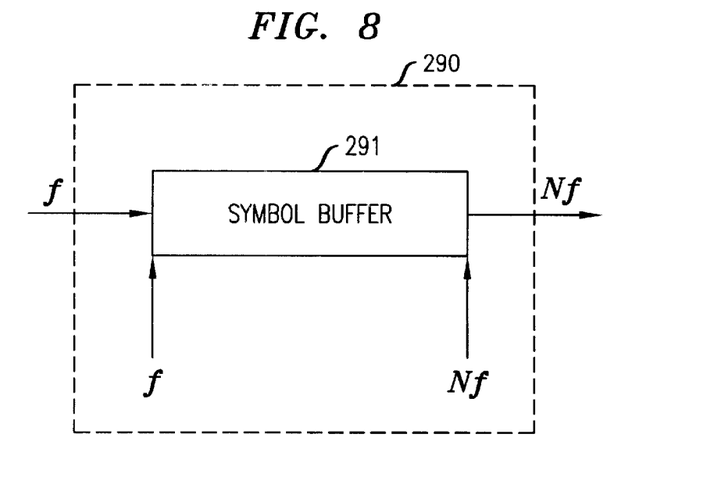
FIG. 8 shows an illustrative coder for use in the transmitter of FIG. 7.

An illustrative ADSL system embodying the principles of the invention is shown in FIG. 6. As described further below, this ADSL system performs "Time Redundant Bandwidth Expansion." The ADSL system comprises ADSL CO equipment 200 coupled to ADSL consumer premise (CP) equipment 300 via twisted pair 136. Each of these is also referred to herein as a multi-carrier endpoint. (The splitter/combiner for the POTS channel has been left out for simplicity.) It is assumed that the ADSL DMT system has disjoint and adjacent upstream and downstream channels (although this is not necessary to the inventive concept). For simplicity, only downstream transmission is described. Upstream transmission is similar and will not be described herein. It should be noted that, other than the inventive concept, the elements shown in FIGS. 6–8 are well-known and will not be described in detail. In addition, techniques for generating different clock frequencies are well-known and will not be described herein.

Before describing different examples of "redundant forms" that may be used in the inventive concept, the transmitter and receiver portions of corresponding multi-carrier equipment embodying the principles of the invention are described.

A transmitter portion 250 of ADSL CO equipment 200 is shown in FIG. 7. Transmitter portion 250 comprises serial-to-parallel converter (S/P) 205, symbol mappers 210, inverse fast Fourier transform element (IFFT) 215, cyclic extender (CE) 220, parallel-to-serial converter (P/S) 225, digital-to-analog converter (D/A) 230, N$f$ coder 290, and hybrid 235. A data signal is applied to S/P 205, which converts the data signal from serial to parallel form and provides 256 signals $n_0$ through $n_{255}$. Signals $n_0$ through $n_{255}$ are applied to symbol mappers 210. The latter comprises 256 symbol mappers, one for each of the parallel output signals of S/P 205. (As described above, the number of bits encoded by each symbol mapper, and hence the number of bits S/P 225 provides in each $n_1$ is determined as a result of a spectral response determined during the training phase.) The resulting 256 output symbol streams from symbol mappers 210 are complex valued and are applied to IFFT 215, which modulates the various different carriers with the output symbol stream to provide 512 output signals. (IFFT 215 takes the complex conjugate (not shown) of the 256 output symbol streams to provide 512 real signals.) The 512 output signals from IFFT 215 are applied to CE 220, which performs cyclic extension (described above) and provides extended symbols in parallel form. These extended symbols are then applied to P/S 225, which provides a sequence of extended DMT symbols at a symbol rate of $f$ symbols/sec. In accordance with the inventive concept, N$f$ coder 290 (described below) receives the applied DMT symbols at the rate $f$ and forms a multi-carrier signal, N$f$, for transmission having a symbol rate N$f$, where the applied DMT symbols appear in a redundant form. The multi-carrier signal N$f$ is converted from digital to analog by A/D 230. The latter provides a downstream ADSL signal representing a sequence of extended DMT symbols at a symbol rate N$f$ to hybrid 135, which couples this downstream ADSL signal to twisted pair 136.

An illustrative N$f$ coder 290 is shown in FIG. 8. N$f$ coder 290 comprises a one symbol buffer 291. The applied DMT symbols are sampled at a frequency $f$ into buffer 291. The DMT sample value in buffer 291 is clocked out at a rate N$f$.

Figure 9:
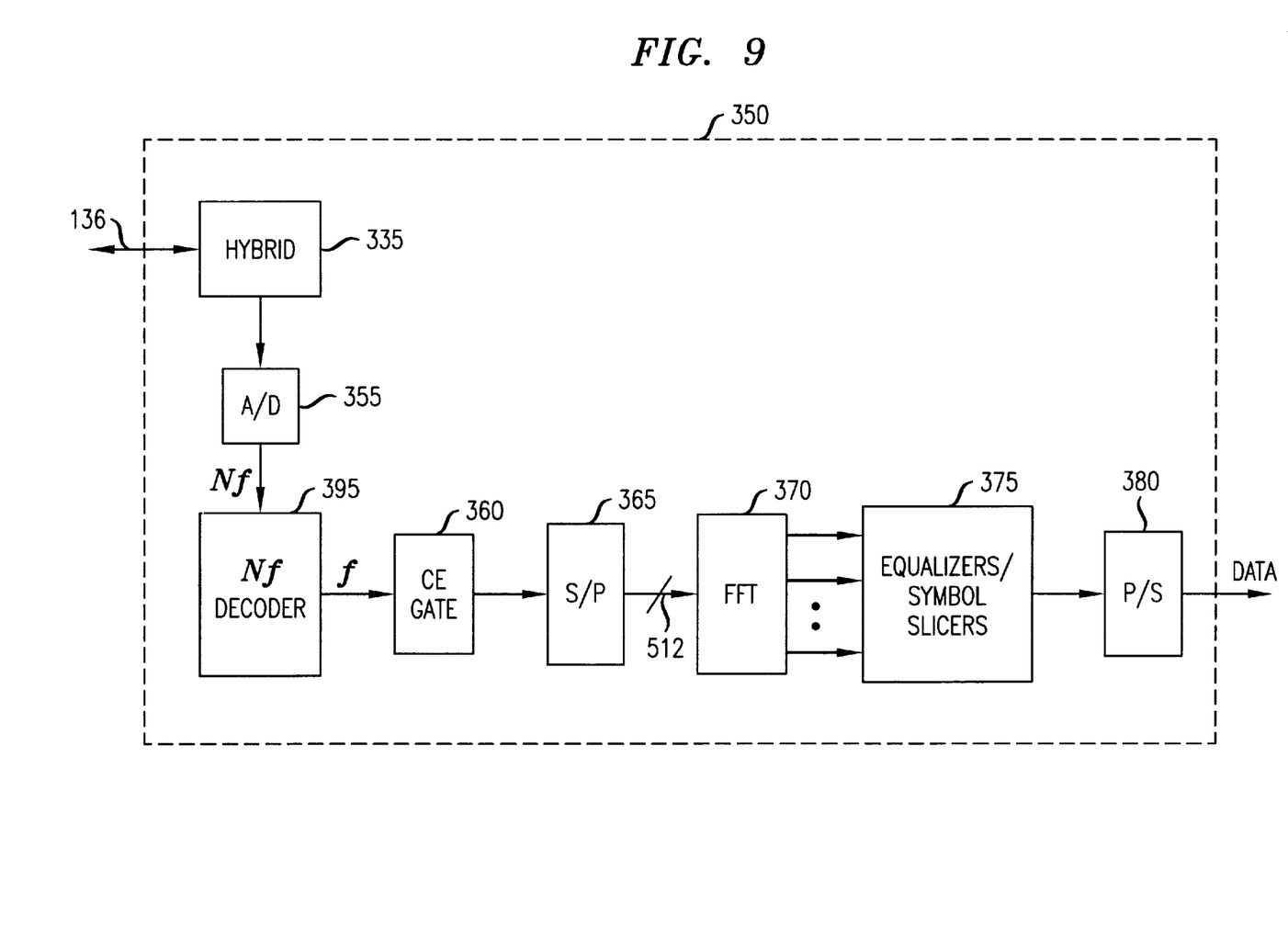
FIG. 9 shows a portion of a receiver in accordance with the principles of the invention.

A corresponding receiver portion 350 of ADSL CP equipment 300 is shown in FIG. 9. Receiver portion 350 comprises hybrid 335, analog-to-digital converter (A/D) 355, Nf decoder 395, CE gate 360, S/P 365, fast Fourier transform element 370, equalizer/symbol slicer 375, and P/S 380. Hybrid 335 couples the received downstream ADSL signal from twisted pair 136 to A/D 355, which converts the signal from analog to digital and provides a digital form of a received multi-carrier signal representing a sequence of received extended DMT symbols having a symbol rate Nf symbols/sec. Nf decoder 395 recovers extended DMT symbols (described below) and provides the recovered extended DMT symbols at f symbols/sec. to CE gate 360. CE gate 360 extracts DMT symbols from each received extended DMT symbol, as known in the art. (It should be noted that the function of CE gate 360 could alternatively be performed after S/P 365.) The output signal from CE gate 360 is applied to S/P 365, which provides 512 output signals to FFT 370 which recovers the symbols from each of the carriers. Equalizers/symbol slicers 375 represents a plurality of equalizer and symbol slicer structures, one for each carrier for recovering the data signal in parallel form. The output signals of equalizers/symbol slicers 375 are applied to P/S 380 for converting the data signal back into serial form.

Figure 10:
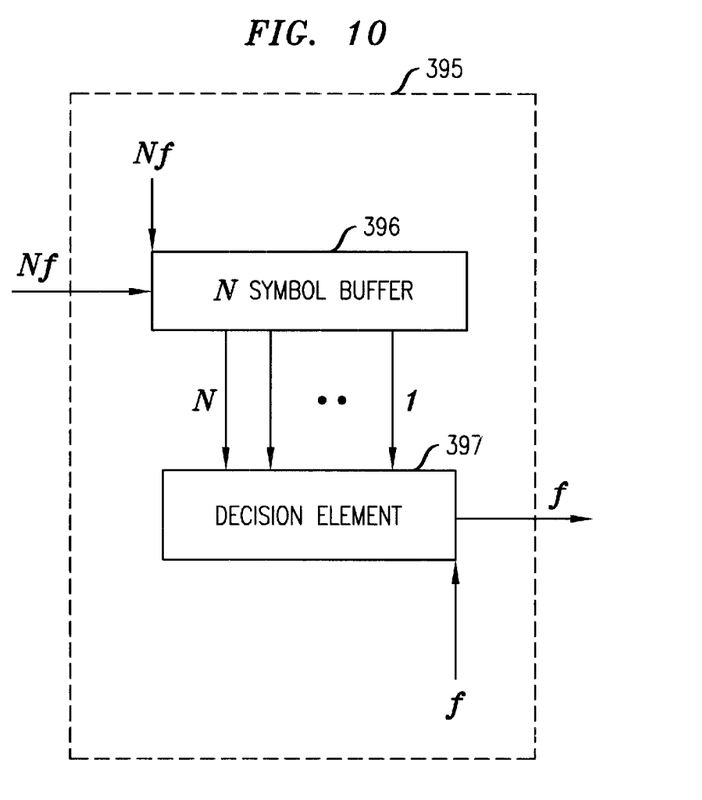
FIG. 10 shows an illustrative decoder for use in the receiver of FIG. 9.

An illustrative N$f$ decoder 395 is shown in FIG. 10. N$f$ coder 395 comprises N symbol buffer 396, and decision element 397. The received multi-carrier signal is sampled at N$f$ symbols/sec. into symbol buffer 396. The latter stores N sampled DMT symbol values. These N sample values are applied to decision element 397 (described further below) which makes a decision as to the received DMT symbol. These recovered DMT symbols are provided to CE gate 360 at a symbol rate of $f$ symbols/sec. (described above).

Although the higher symbol rate N$f$ seemingly increases the complexity of equipment designed to transmit and receive such higher rate signals since there are N as many symbols to process (e.g., via FFT, and IFFT, etc.), the inventive concept of using redundant forms of the symbols does not add significant complexity and improves protection against impulse noise (described below). As shown in FIGS. 7 and 9 implementations of the inventive concept do not require additional IFFT processing in the transmitter, nor FFT processing in the receiver.

Figure 11:
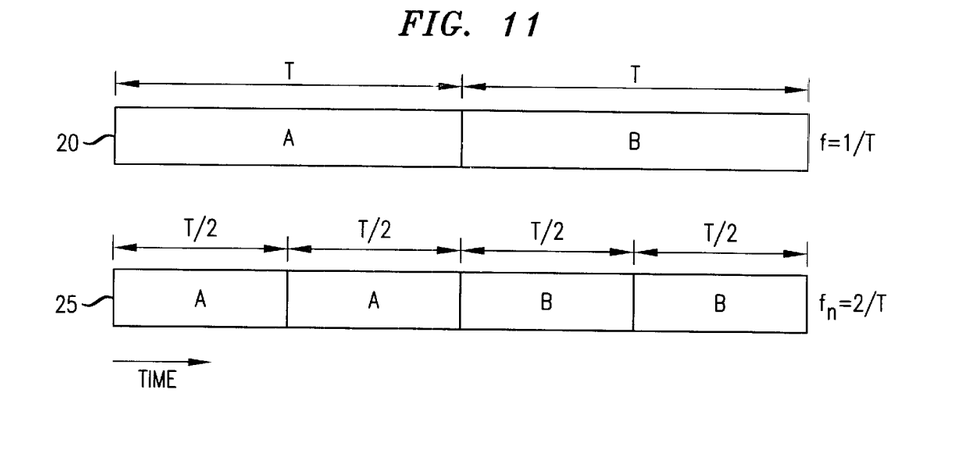
FIGS. 11–13 illustrate different types of redundant forms.

One illustrative redundant form is shown in FIG. 11. In the example of FIG. 11, N=2. As such, every DMT symbol selected for transmission is transmitted twice. DMT symbol sequence 20 represents a portion of a stream of selected DMT symbols applied to N$f$ coder 290. For example, in the first symbol interval, T, N$f$ coder 290 receives a DMT symbol A followed by a DMT symbol B in the next symbol interval T. For each received symbol in a symbol interval T, N$f$ coder 290 provides 2 corresponding output symbols, as represented by sequence 25, which shows transmission of 2 DMT A symbols at a rate 2/T followed by transmission of 2 DMT B symbols, etc. (The same number of subcarriers as in the applied DMT symbol are used, they are just spaced further apart.) As such, and in accordance with the principles of the invention, since only redundant forms of the currently selected symbol is being transmitted, there is no need to perform addition IFFT processing in the transmitter.

Illustratively, when N=2, corresponding decision element 397 (in decoder element 395, of FIG. 10) simply recovers the DMT symbol by adding the corresponding samples of the two received copies A' and A". The results of the addition are applied to CE gate 360 (described above).

When N=2, the inventive concept results in a 3 dB performance improvement in the presence of Gaussian noise, herein referred to as a "combining gain." This performance improvement is possible because twice the power is transmitted since twice the bandwidth is used (twice the symbol rate). This idea can be extended to N=3, i.e., to a symbol rate of 3$f$ symbols/sec as shown in FIG. 12.

Figure 12:
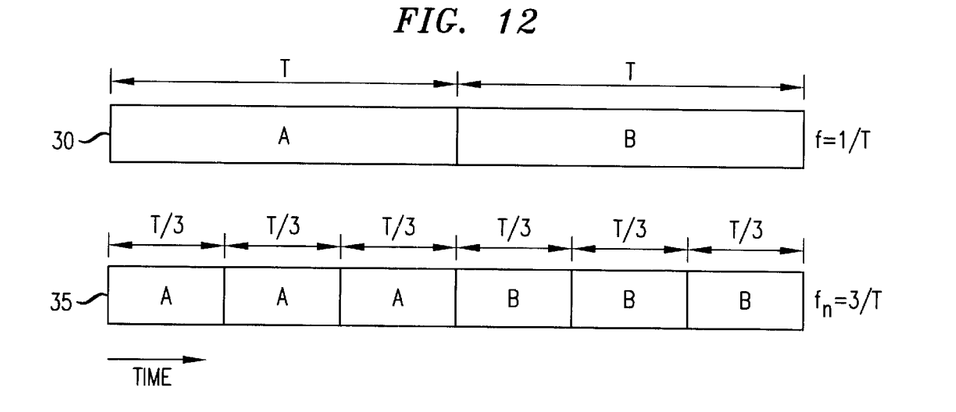

In the example of FIG. 12, every DMT symbol selected for transmission is transmitted three times. DMT symbol sequence 30 represents a portion of a stream of selected DMT symbols applied to N$f$ coder 290. For example, in the first symbol interval, T, N$f$ coder 290 receives a DMT symbol A followed by a DMT symbol B in the next symbol interval T. For each received symbol in a symbol interval T, N$f$ coder 290 provides 3 corresponding output symbols, as represented by sequence 35, which shows transmission of 3 DMT A symbols at a rate 3/T followed by transmission of 3 DMT B symbols, etc. In the case of N=3, three times the bandwidth is used and a combining gain of 4.5 dB results in the presence of Gaussian noise. (It should be noted that all of this 4.5 dB combining gain may not be realized if the channel has a significant attenuation in the expanded portions of the frequency band).

Illustratively, when N=3, corresponding decision element 397 (in decoder element 395, of FIG. 10) simply recovers the DMT symbol by adding the corresponding samples of the three received copies A', A" and A'". The results of the addition are applied to CE gate 360 (described above).

However, although the inventive concept provides modest performance enhancements for Gaussian noise, significant immunity to impulse noise is also possible. For example, in the case of N=3, instead of simply adding the three received copies, decision element 397 uses a majority rule decision algorithm for selecting the recovered symbol. In particular, decision element 397 selects those two received copies that match and discards the received copy that does not match. (This decision algorithm assumes that impulse noise will predominately effect only one symbol at a time. As such other algorithms may also be used.)

Even though 3$f$ symbols/sec. redundant signaling provides immunity to impulse noise, it expands the used bandwidth by a factor of three. If the channel attenuation in the expanded bandwidth is high, there may be a loss in performance for Gaussian noise. As such, FIG. 13 shows an N=2 scheme that provides impulse noise immunity with only a doubling of the bandwidth.

Figure 13:
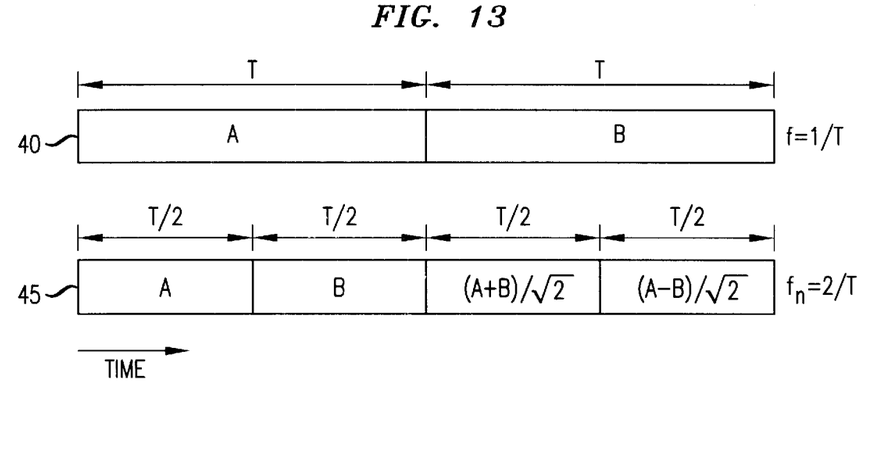

In the example of FIG. 13, every N=2 DMT symbols selected for transmission are transmitted in a consecutive four T/2 symbol intervals in a redundant form. DMT symbol sequence 40 represents a portion of a stream of selected DMT symbols applied to N$f$ coder 290. For example, in the first symbol interval, T, N$f$ coder 290 receives a DMT symbol A. This is followed by a DMT symbol B in the next symbol interval T. For each received symbol pair over these two T symbol intervals, N$f$ coder 290 provides 4 corresponding output symbols as represented by sequence 45, which shows transmission of 4 DMT symbols at a rate 2/T. These output symbols include 1) 2 symbols whose values equal the respective 2 DMT input symbol values and 2) 2 symbols whose values are a function of the respective 2 DMT input symbol values. Here, the illustrative functions are represented by $((A+B)/\sqrt{2})$ and $((A-B)/\sqrt{2})$.

Figure 14:
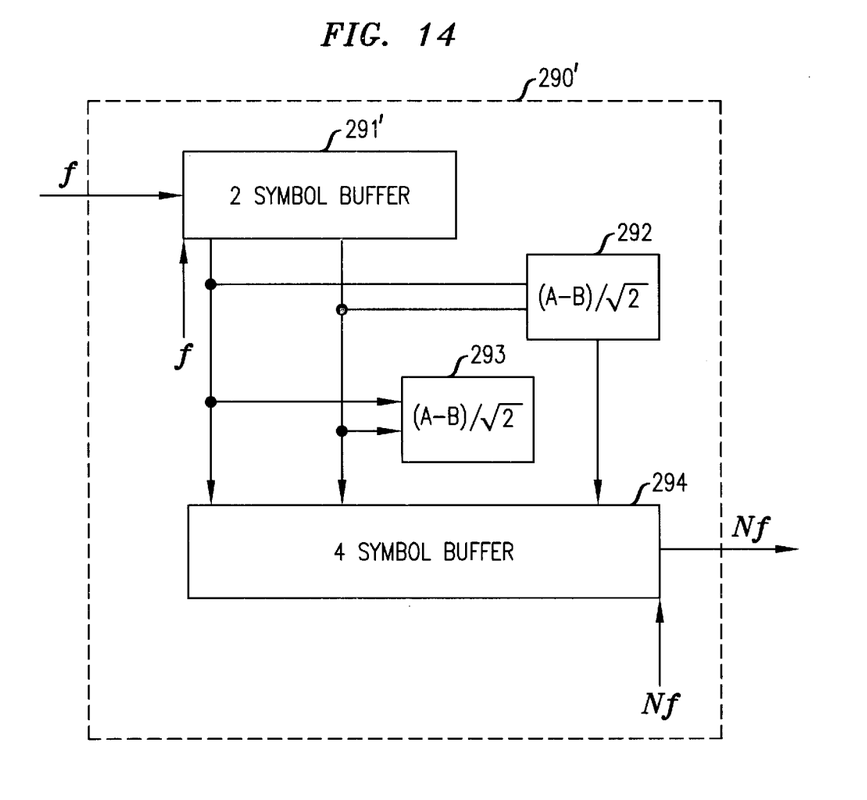
FIG. 14 shows a modified form of coder for use in the transmitter of FIG. 7.

A corresponding modified form of N$f$ coder 290 is shown in FIG. 14 as N$f$ coder 290'. The latter comprises 2 symbol buffer 291', which receives input DMT symbols at a rate $f$. These two symbol values are applied to 4 symbol buffer 294 and to elements 292 and 293, which generate the other required redundant forms of these symbol values. The symbol values stored in 4 symbol buffer 294 are transmitted out at frequency N$f$ (here N=2). As long as only one of the four transmitted symbols is affected by an impulse there is immunity to impulse noise since the symbols A and B can always be recovered from the remaining three symbols. In effect, three copies of both symbols A and B are transmitted. In addition a combining gain of 3 dB against Gaussian noise also results.

Figure 15:
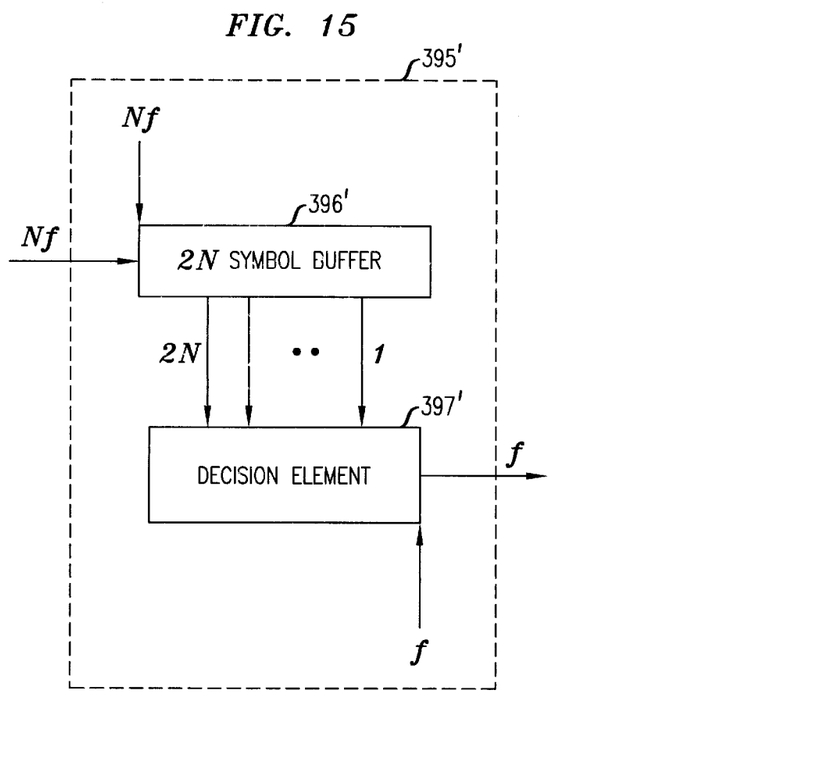
FIG. 15 shows a modified form of decoder for use in the receiver of FIG. 9.

Similarly, corresponding decision element 397 (in decoder element 395, of FIG. 10) is modified to perform the complementary functions to recover copies A', A" and A'" and B', B" and B'", as illustrated in FIG. 15. Illustrative N$f$ decoder 395' comprises 2N symbol buffer 396', and decision element 397'. The received multi-carrier signal is sampled at N$f$ symbols/sec. into symbol buffer 396'. The latter stores 2N sampled DMT symbol values. These 2N sample values are applied to decision element 397' which makes a decision as to the received DMT symbol using the complementary functions shown above. (Those in the art will realize the similarity to stereo FM demodulation for recovering the left and right stereo channels). Instead of simply adding the three recovered copies, decision element 397' also uses a majority rule decision algorithm for selecting the recovered symbol. In particular, decision element 397' selects those two received copies that match and discards the received copy that does not match. The selected symbol is applied CE gate 360 at a symbol rate of $f$ symbols/sec.

A signal modulated by the DMT scheme (also known as orthogonal frequency division multiplexing (OFDM)) typically has a high peak-to-average signal ratio. For a given precision in the digital to analog converter and analog drivers (amplifiers) (not shown), a transmit DMT signal can be clipped by a certain probability. To reduce this probability, the prior art technique of "back-off" is used. Unfortunately, back-off increases the power consumption in analog drivers (not shown) and reduces the available bits in the A/D for a given average power in the corresponding received signal.

Figure 16:
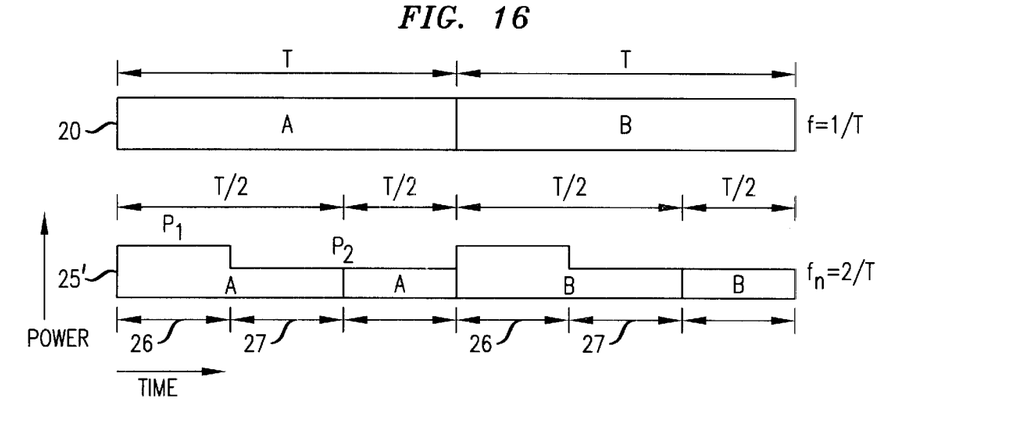
FIG. 16 shows another type of redundant form.

However, and in accordance with the principles of the invention, if a DMT symbol is subject to clipping by either the above-mentioned A/D or analog devices, one can transmit a DMT symbol as shown in FIG. 16. In the example of FIG. 16, N=2. As such, every DMT symbol selected for transmission is transmitted twice. DMT symbol sequence 20 represents a portion of a stream of selected DMT symbols applied to N$f$ coder 290. For example, in the first symbol interval, T, N$f$ coder 290 receives a DMT symbol A followed by a DMT symbol B in the next symbol interval T. For each received symbol in a symbol interval T, N$f$ coder 290 provides 2 corresponding output symbols, as represented by sequence 25', which shows transmission of 2 DMT A symbols at a rate 2/T followed by transmission of 2 DMT B symbols, etc. In addition, the average power levels of the symbols are possibly adjusted as shown. During a portion of time 26, the first DMT A symbol is transmitted at the received average power level of $P_1$. If $P_1$ is greater than a predetermined threshold, the remainder 27 of the first DMT A symbol is transmitted at a predetermined average power level $P_2$. The second, repeated, DMT symbol A is also transmitted at an average power level $P_2$. If $P_1$ is less than or equal to the predetermined threshold, the transmission occurs in a similar fashion to that shown in FIG. 10, described above, i.e., all at the same power level. Similar comments apply to the redundant transmission of DMT symbol B. The ratio between $P_1$ and $P_2$ is a function of the severity of the peaks in this DMT symbol. The value of this ratio can be selected from a discrete set of values or can be determined by a continuous function. The advantage of using this scheme is to minimize or completely eliminate the need of back-off in the A/D and or analog devices. To implement this scheme N$f$ coder 290 is suitably modified to provide the above-mentioned conditional power control.

Illustratively, when N=2, corresponding decision element 397 (in decoder element 395, of FIG. 10) simply recovers the DMT symbol by adding the corresponding samples of the two received copies A' and A". The results of the addition are applied to CE gate 360 (described above). When a difference in the average power of a received DMT symbol is noticed, decision element 397 ignores the first one and uses the repeated one for data recovery.

In other words, the inventive concept also allows minimizing the effects of a high peak-to-average DMT signal. If a given DMT symbol has an unacceptable (above some threshold) peak, it is first transmitted unaltered (or a portion thereof). The subsequent copy (or copies or portions of a copy) are transmitted with some fixed attenuation (3–6 dB). The receiver can than easily detect this and ignore the first copy. In this manner, one can transmit a higher average power without seriously suffering when an occasional signal with a large peak is encountered.

Figure 17:
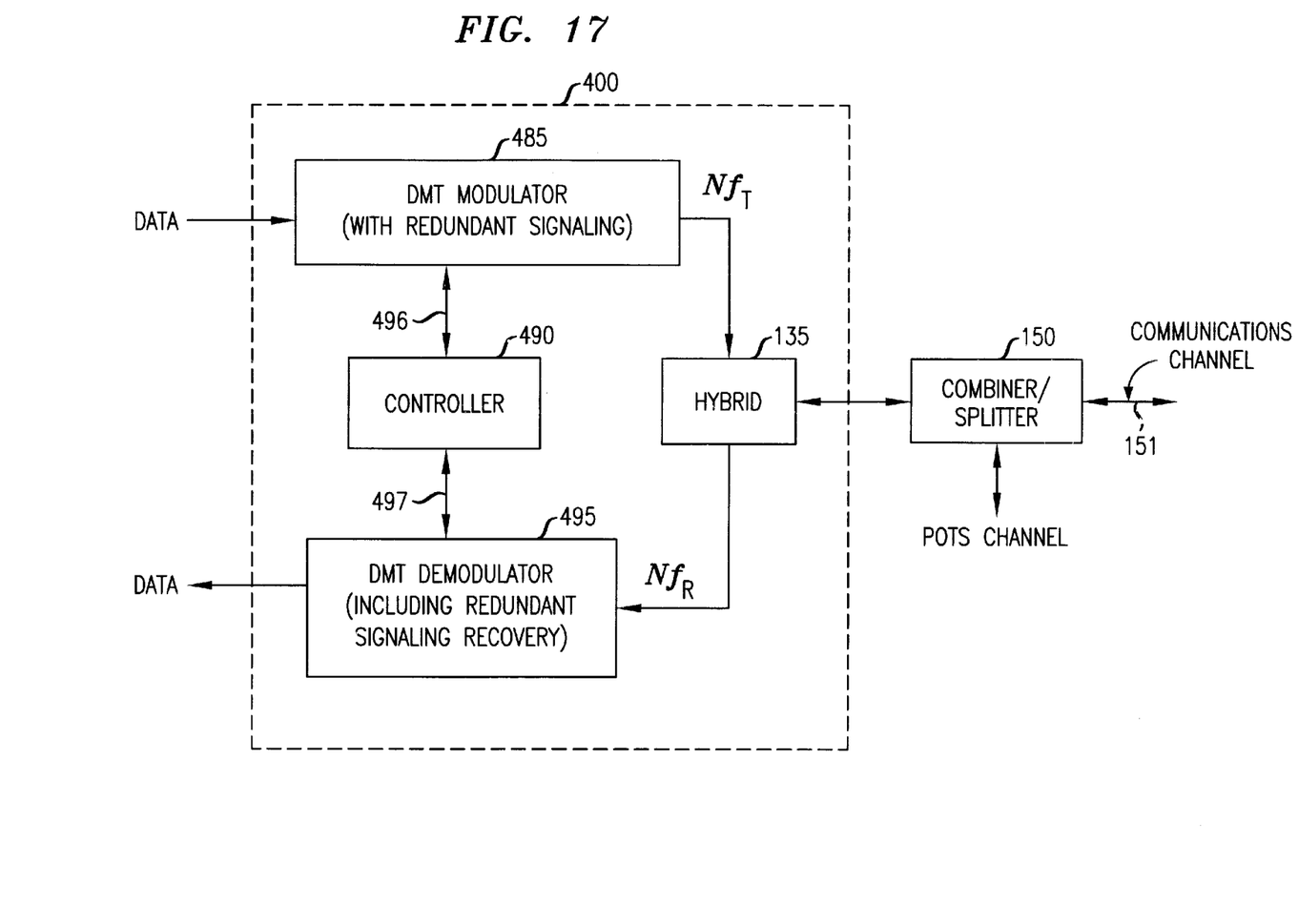
FIG. 17 shows ADSL equipment in accordance with the principles of the invention.

Illustrative ADSL equipment 400 embodying the principles of the invention for use in the ADSL system of FIG. 6 is shown in FIG. 17. DSL equipment 400 comprises DMT modulator 485, with redundant signaling (described above), DMT demodulator 495, with recovery of redundant signaling (described above), hybrid 135, and controller 490, which is illustratively a stored-program controller and associated memory as known in the art. DMT modulator 485 forms an ADSL signal with redundant signaling at a symbol rate H$f_T$ for transmission on twisted pair 151 via hybrid 135 and combiner/splitter 150. DMT demodulator 495 recovers data from received ADSL signals provided by combiner/splitter 150 and hybrid 135. These received ADSL signals represent received sequences of DMT symbols at a rate of N$f_R$. (As indicated by the notation N$f_T$ and N$f_R$, the transmit and received frequencies can be different.) Controller 490 controls and receives information from DMT modulator 485 and DMT demodulator 495 via signaling 496 and 497, respectively.

As described above, and in accordance with the inventive concept, a multi-carrier communications system transmits each symbol in a redundant form over N symbol intervals. Although the examples illustrated redundant forms where an input symbol is transmitted over N consecutive output symbol intervals, the inventive concept is not so limited and other techniques, e.g., interleaving, could also be used. Similarly, N input symbol values can be transmitted in a redundant form over M output symbols intervals, where M≧2N. As such, the foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was illustrated herein as being implemented with discrete functional building blocks, e.g., DMT modulator, N$f$ coder, etc., the functions of any one or more of those building blocks can be carried out using one or more appropriately programmed processors, e.g., a digital signal processor, etc.

In addition, although the inventive concept was illustrated in the context of both upstream and downstream channels conveying the redundant signaling, the inventive concept could be applied to just one channel. Indeed, redundant signaling itself is an operating parameter that could be selected during the above-mentioned training phase.

Also, although the inventive concept was illustrated using a specific ADSL DMT bandwidth allocation scheme, the inventive concept is applicable to ADSL DMT in general including those versions that extend above 1.1 Mhz and symmetric DSL. Indeed, the inventive concept is applicable to any multi-tone, or multi-carrier, communications system DSL or otherwise, e.g., a wireless system. In the latter, it should be noted that each multi-tone symbol may represent information from a plurality of subscribers, nevertheless, the inventive concept is still applicable.

What is claimed is:

1. A method for use in multi-carrier equipment, the method comprising the steps of:
   receiving a data signal; and
   coding the data signal into a multi-carrier signal for transmission such that each symbol value is transmitted in a redundant form over at least one additional symbol interval wherein the coding step includes the steps of
   receiving a sequence of symbols at a first symbol rate f, and
   providing the multi-carrier signal at a symbol rate Nf, where N>1 and such that each group of N symbol values from the sequence is transmitted over 2N symbol intervals in the multi-carrier signal, and where the 2N symbol intervals comprise 1) N symbols whose values equal the respective N symbols values from each group, and 2) N symbols whose values are a function of the respective N symbol values of the group.

2. The method of claim 1 wherein the multi-carrier equipment is asynchronous digital subscriber line (ADSL) equipment.

3. The method of claim 1 wherein each group comprises N=2 symbol values, a first value and a second value and wherein the four symbol intervals in the multi-carrier signal comprise 1) the first value and the second value, and 2) the total of the first value plus the second value divided by the square root of 2, and the difference of the first value and the second value divided by the square root of 2.

4. A method for use in multi-carrier equipment, the method comprising the steps of:
   receiving a data signal;
   encoding the data signal into a first multi-carrier signal having a symbol rate f; and
   expanding the bandwidth of the first multi-carrier signal by forming a second multi-carrier where each symbol value of the first multi-carrier signal is transmitted in a redundant form in the second multi-carrier signal for transmission to a far end multi-carrier equipment
   wherein the redundant form comprises groups of 2N symbols, each group comprising 1) N symbols whose values equal a respective N symbols values from the first multi-carrier signal, and 2) N symbols whose values are a function of the respective N symbols values from the first multi-carrier signal.

5. The method of claim 4 wherein the multi-carrier equipment is asynchronous digital subscriber line (ADSL) equipment.

6. The method of claim 4 wherein the redundant form comprises groups of 4 symbols, each group comprising 1) 2 symbols, each of whose values equal a respective first symbol value and a second symbol value from the first multi-carrier signal, and 2) a symbol whose value is equal to the total of the first symbol value plus the second symbol value divided by the square root of 2, and a symbol whose value is equal to the difference of the first symbol value and the second symbol value divided by the square root of 2.

7. Apparatus for use in multi-carrier equipment, the apparatus comprising:
   means for receiving a data signal;
   means for encoding the data signal into a first multi-carrier signal having a symbol rate f; and
   means for expanding the bandwidth of the first multi-carrier signal by forming a second multi-carrier where each symbol value of the first multi-carrier signal is transmitted in a redundant form in the second multi-carrier signal for transmission to a far end multi-carrier equipment
   wherein the redundant form comprises groups of 2N symbols, each group comprising 1) N symbols whose values equal a respective N symbols values from the first multi-carrier signal, and 2) N symbols whose values are a function of the respective N symbols values from the first multi-carrier signal.

8. The apparatus of claim 7 wherein the multi-carrier equipment is asynchronous digital subscriber line (ADSL) equipment.

9. The apparatus of claim 7 wherein the redundant form comprises groups of 4 symbols, each group comprising 1) 2 symbols, each of whose values equal a respective first symbol value and a second symbol value from the first multi-carrier signal, and 2) a symbol whose value is equal to the total of the first symbol value plus the second symbol value divided by the square root of 2, and a symbol whose value is equal to the difference of the first symbol value and the second symbol value divided by the square root of 2.

10. Apparatus for use in multi-carrier equipment, the apparatus comprising:
    modulator circuitry responsive to a data signal for providing a first multi-carrier signal having a symbol rate f; and
    processing circuitry for expanding the bandwidth of the first multi-carrier signal by forming a second multi-carrier where each symbol value of the first multi-carrier signal is transmitted in a redundant form in the second multi-carrier signal for transmission to a far end multi-carrier equipment
    wherein the redundant form comprises groups of 2N symbols, each group comprising 1) N symbols whose values equal a respective N symbols values from the first multi-carrier signal, and 2) N symbols whose values are a function of the respective N symbols values from the first multi-carrier signal.

11. The apparatus of claim 10 wherein the multi-carrier equipment is asynchronous digital subscriber line (ADSL) equipment.

12. The apparatus of claim 10 wherein the redundant form comprises groups of 4 symbols, each group comprising 1) 2 symbols, each of whose values equal a respective first symbol value and a second symbol value from the first multi-carrier signal, and 2) a symbol whose value is equal to the total of the first symbol value plus the second symbol value divided by the square root of 2, and a symbol whose value is equal to the difference of the first symbol value and the second symbol value divided by the square root of 2.

13. The apparatus of claim 10 wherein the processing circuitry is a bandwidth expander.

14. The apparatus of claim 10 wherein the processing circuitry is a coder.

15. An improved multi-carrier equipment for use in transmitting a multi-carrier signal having a symbol rate f to a far-end multi-carrier equipment, the improvement comprising:
    a bandwidth expander for expanding the bandwidth of the multi-carrier signal by N, where each symbol value of the multi-carrier signal is transmitted in a redundant form in the expanded multi-carrier signal for transmission to the far end multi-carrier equipment
    wherein the redundant form comprises groups of 2N symbols, each group comprising 1) N symbols whose values equal a respective N symbols values from the multi-carrier signal, and 2) N symbols whose values are a function of the respective N symbols values from the multi-carrier signal.

16. The improvement of claim 15 wherein the multi-carrier equipment is asynchronous digital subscriber line (ADSL) equipment.

17. The improvement of claim 15 wherein the redundant form comprises groups of 4 symbols, each group comprising 1) 2 symbols, each of whose values equal a respective first symbol value and a second symbol value from the multi-carrier signal, and 2) a symbol whose value is equal to the total of the first symbol value plus the second symbol value divided by the square root of 2, and a symbol whose value is equal to the difference of the first symbol value and the second symbol value divided by the square root of 2.

* * * * *